(No Model.) 3 Sheets—Sheet 1.

W. CLARK.
PHOTOGRAPHIC CAMERA.

No. 308,468. Patented Nov. 25, 1884.

WITNESSES:
Donn Twitchell.
C. Sedgwick.

INVENTOR:
W. Clark
BY Munn & Co.
ATTORNEYS.

(No Model.) 3 Sheets—Sheet 2.

W. CLARK.
PHOTOGRAPHIC CAMERA.

No. 308,468. Patented Nov. 25, 1884.

WITNESSES:
Dom Twitchell.
C. Sedgwick.

INVENTOR:
W. Clark
BY Munn & Co
ATTORNEYS.

(No Model.) 3 Sheets—Sheet 3.

W. CLARK.
PHOTOGRAPHIC CAMERA.

No. 308,468. Patented Nov. 25, 1884.

WITNESSES:
Donn Twitchell
C. Sedgwick

INVENTOR:
W. Clark
BY Munn & Co
ATTORNEYS.

UNITED STATES PATENT OFFICE.

WALTER CLARK, OF NEW YORK, N. Y.

PHOTOGRAPHIC CAMERA.

SPECIFICATION forming part of Letters Patent No. 308,468, dated November 25, 1884.

Application filed May 7, 1884. (No model.)

*To all whom it may concern:*

Be it known that I, WALTER CLARK, of the city, county, and State of New York, have invented a new and useful Improvement in Photographic Cameras, of which the following is a full, clear, and exact description.

The main object of my improvements is to provide a camera that does not require the plate-holder to be removed in order to obtain a focus, and replaced again for exposure of the plate; and to that end I provide a movable lens and a fixed focus-plate apart from the opening for the plate-holder. With these devices are combined shutters for instantaneous photographing, and operated automatically by the lens-holder, and for field work the camera is fitted in a case or bag of novel construction and arrangement, all as hereinafter described and claimed.

Reference is to be had to the accompanying drawings, forming part of this specification, in which similar letters of reference indicate corresponding parts in all the figures.

Figure 1:
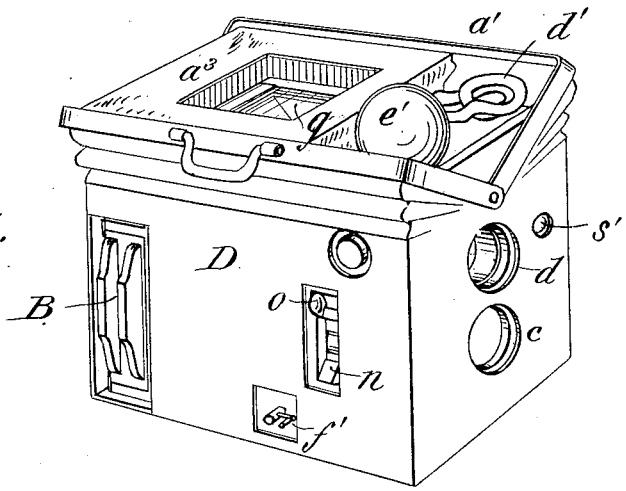
Figure 2:
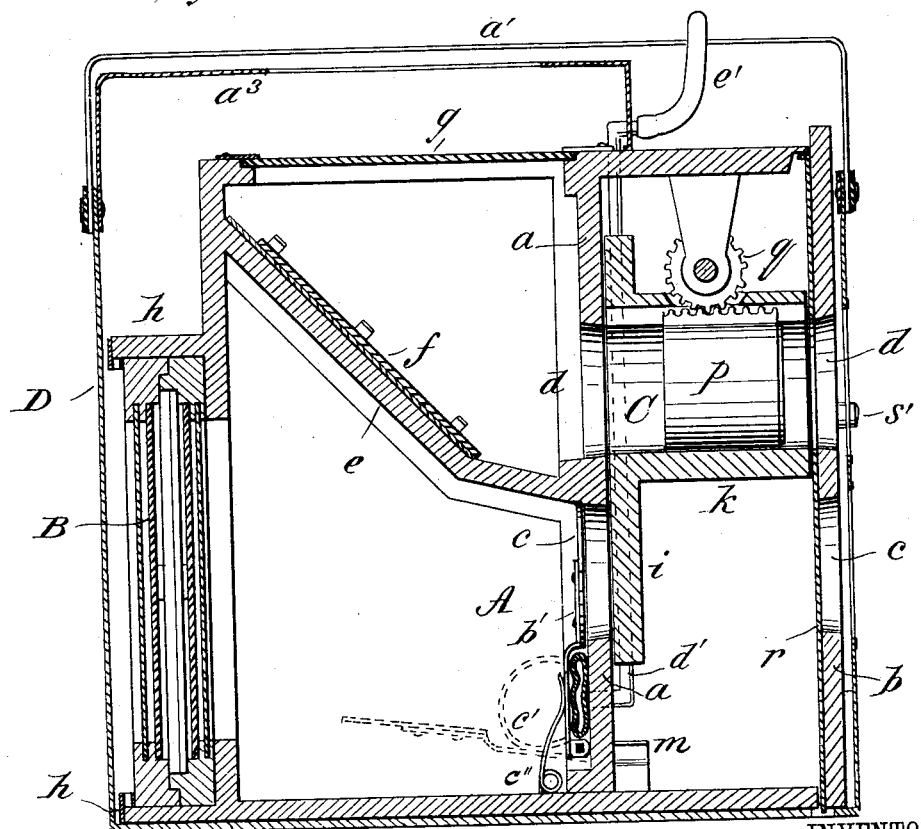
Figure 3:
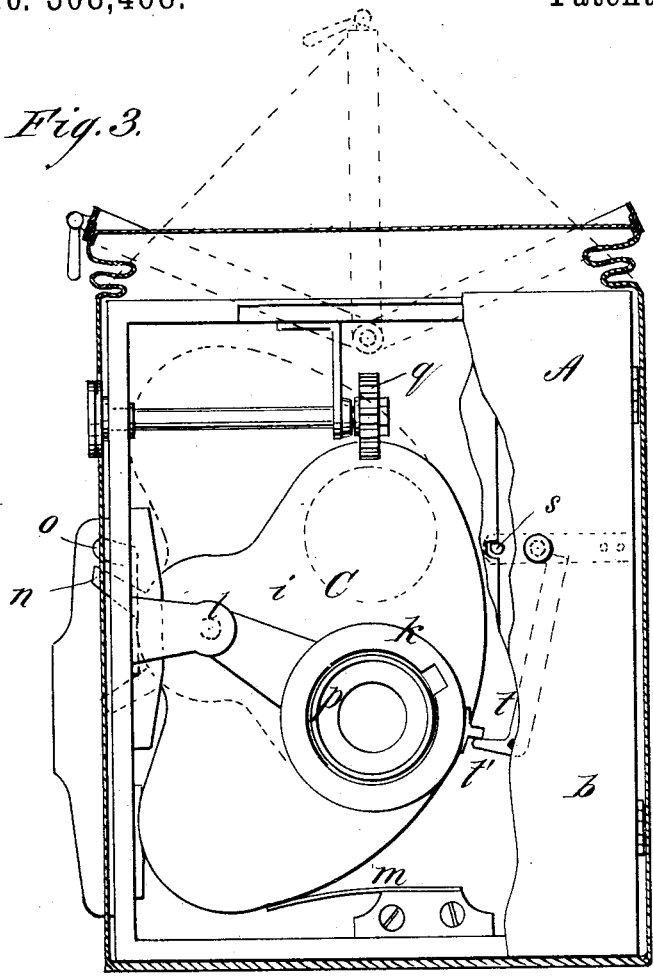
Figure 4:
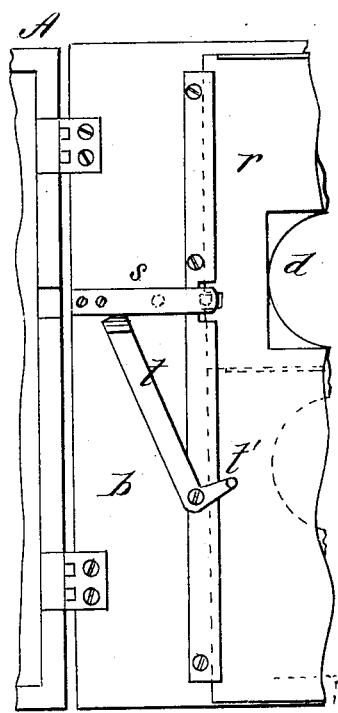
Figure 5:
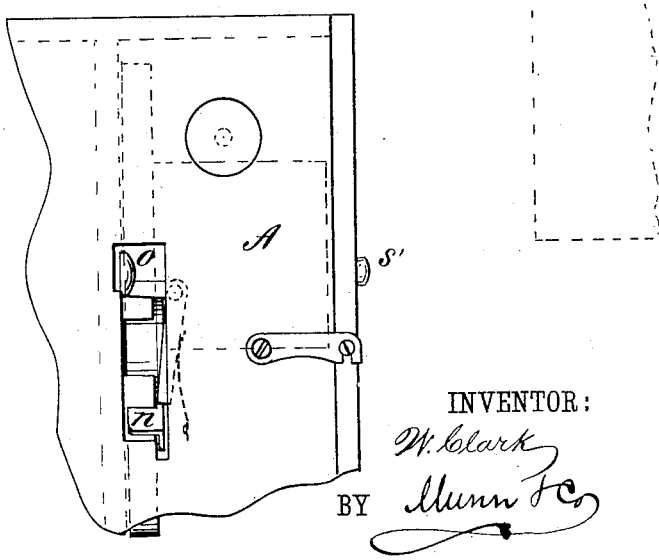
Figure 6:
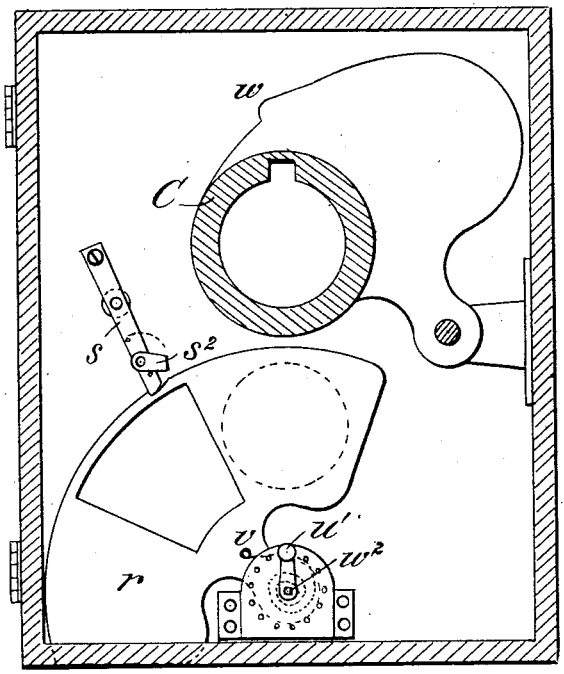
Figure 7:
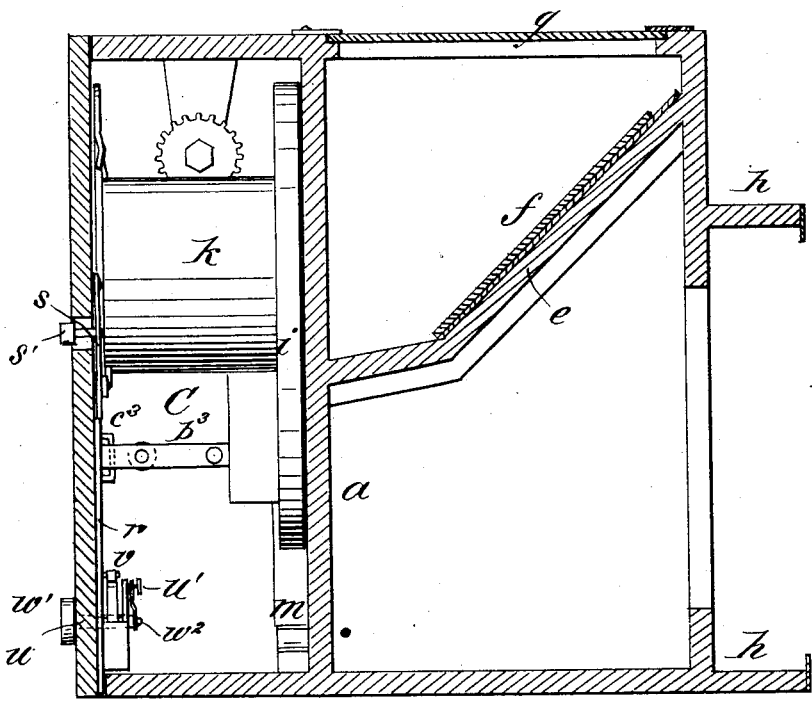

Figure 1 is a perspective view of the camera and case. Fig. 2 is a vertical section of the same. Fig. 3 is a front elevation with the case in section and with the front of the camera partly removed. Fig. 4 is a detail view, looking at the back of the swinging door, and showing the sliding shutter. Fig. 5 is a detail view showing the catch for the moving lens-holder. Fig. 6 is a sectional elevation of the camera with the shutter fitted to swing instead of slide, and Fig. 7 is a cross-section at right angles to Fig. 6.

A is the box of the camera, divided by a vertical partition, $a$, that forms a space at one end of the box and receiving the lens, and $b$ is a hinged door giving access to the interior. The door is retained closed by a spring-latch, $b^3$, catching a loop, $c^3$, on the door, and having a push-button for its operation to release the door.

In partition $a$ and door $b$ are coincident lower apertures, $c$, and upper apertures, $d$, and the space behind the partition is divided by a partition, $e$, commencing above the lower aperture and extending at an angle of forty-five degrees to the back of the box.

Upon the inclined partition $e$ is fixed a mirror, $f$, and in an opening in the top of box A, above the mirror, is the object-glass $g$, held in place by buttons or catches. In the rear of the box is an opening between supports $h\,h$ on the outside, that receive the plate-holder B, of either single or double form.

The lens-holder C (shown in Figs. 2 and 3) consists of a plate, $i$, and a tube, $k$, pivoted on an arbor, $l$, at one side of the box, so that it may be swung to bring the tube in line with either the upper apertures, $d$, or the lower one, $c$, the plate $i$ being of a size and form to always cover the aperture not in use.

$m$ is a buffer-spring to relieve the fall of the holder C.

$n$ is an arm projecting from the holder C through an opening in the box (see Fig. 5) for use in raising the holder.

$o$ is a spring-catch, pivoted at the slot so as to pass over the arm $n$, for retaining the lens when raised.

$p$ is the lens-tube fitting tube $k$, so as to slide therein, and having a rack that when the holder is raised engages a pinion, $q$, on a shaft in the upper part of the box. The shaft extends to the outside of the box, where a thumb-wheel is provided, so that the shaft can be turned to adjust the lens.

In the operation with the parts, so far as described, the plate-holder being in place and lens-carrier C raised, the lens is adjusted until the object is properly focused on glass $g$, to where the image is reflected by the mirror. The shutter of the plate-holder is then withdrawn, the catch $o$ pressed upon to release the lens-holder C, and the latter then falling the lens is brought to the lower apertures and the plate thus exposed, the focus on the plate being the same as on the glass at the top. By pressing on arm $n$ the lens is raised again and the rack engages the pinion, as before.

The length of exposure may be determined by any usual means. For instantaneous photography I provide a moving perforated shutter operated by the swinging lens-holder. In Figs. 2 and 4 this shutter $r$ is fitted in slide-ways at the back of door $b$, and is held up by a spring-catch, $s$, that engages a notch in the shutter, so that its aperture is at the focusing openings $d$. A pivoted arm, $t$, having a beveled end extending beneath catch $s$, has also a projection, $t'$, in the path of the lens-holder, so that when the latter reaches its extreme downward position, $i$, the holder strikes the projection $t'$, forcing catch $s$ forward and releasing the shutter, which then drops far enough to carry the aperture past the opening $c$. The catch $s$ may also be operated from the outside by a button, $s'$.

In Figs. 6 and 7 the shutter $r$ is made to rotate in connection with the lower aperture, $c$. It is hung on a pivot, $u$, and a coiled spring, $v$, on an arbor, $w^2$, is connected to the shutter, which spring, when released, throws the shutter over. The arbor $w^2$ has a spring-arm and catch, $u'$, for adjusting the tension of the spring, which when properly set is held by the catch engaging one of the holes in the supporting-bracket. A knob, $w'$, on pivot-pin $u$ serves for turning the shutter back, and in this position it is held by a catch, $s$, which has a pivoted trip, $s^2$. On the lens-holder is a projection, $w$, that forces the trip behind the catch, thereby releasing the shutter. The trip may be turned up, when it is preferred to release the catch, by the finger-button $s'$.

When the instantaneous shutter is not to be used, the time of exposure may be regulated by any suitable means. For that purpose the hinged pneumatic shutter $b'$, Fig. 2, is provided at aperture $c$, in partition $a$, and a spring, $e'$, acts to raise the shutter, and thus close the aperture. Between this shutter $b'$ and the partition is an elastic bulb, $c''$, connected by a tube, $d'$, to a bulb, $e'$, at the outside of the camera. When bulb $e'$ is compressed, the bulb $c'$ is inflated and the shutter moved down for exposure of the plate, and the shutter is instantly raised again by the spring when bulb $e'$ is released. Where this pneumatic shutter is combined in the same camera with an instantaneous shutter, a catch, as shown at $f'$ in Fig. 1, is provided for holding shutter $b'$ down.

The camera is inclosed in a bag or case, D, of flexible material, made with a hinged frame, $a'$, at the top, which may be opened to give access to the object-glass, and the case has openings in its sides at the apertures to allow access when required. At the top the case is fitted with a diaphragm, $a^3$, of flexible material, having an aperture over the object-glass, so as to serve as a hood in the focusing. This case serves to protect the camera and as a convenient means for carrying it.

I do not limit myself to the special construction shown in respect to the division of the camera-box and location of the lens and object-glass, as these may be differently arranged and obtain the same results.

Having thus described my invention, what I claim as new, and desire to secure by Letters Patent, is—

1. A photographic-camera box having a partition forming a separate focusing-chamber with an object-glass in one side thereof, and a movable lens constructed to coincide with either of said apertures, substantially as shown and described.

2. The combination, in a camera-box having separate apertures $c$ $d$, of partition $e$, mirror $f$, object-glass $g$, and movable lens-holder C, substantially as shown and described.

3. The combination, with a camera-box having a separate focusing-chamber, of a lens fitted for movement into position at either the focusing or exposure apertures, substantially as described.

4. The combination, with a camera having a separate focusing-chamber, of the pivoted lens-holder C, and a catch for retaining the holder in a raised position, substantially as described.

5. The combination, with a camera having a separate focusing-chamber, of the movable lens-holder C, lens-tube $p$, provided with a rack, and a shaft and pinion, $q$, substantially as described.

6. The combination, with a camera having a separate focusing-chamber, a pinion for adjusting the lens, and a movable lens having a rack that engages the pinion in one position, of the lens, substantially as described.

7. The combination, with a camera having a separate focusing-chamber, of swinging lens-holder C, arm $n$, and catch $s$, substantially as described.

8. In a camera having a swinging lens-holder, the combination therewith of a buffer-spring, substantially as described.

9. In a camera, the diaphragm or hood $a^3$, combined with a case having a folding top, substantially as described.

10. The combination, with a camera having a swinging lens-holder and separate focusing-chamber, of a movable shutter covering the exposure-aperture, and a trip for releasing the shutter, substantially as described.

11. The combination, with a camera having a swinging lens-holder and a separate focusing-chamber, of a pivoted shutter covering the exposure-aperture and fitted to rotate for exposure of the plate, substantially as described.

12. The combination, with a camera having a swinging lens-holder and a separate focusing-chamber, of the pivoted shutter $r$, spring $v$, and catch $s$, substantially as described, for operation, as specified.

13. In a camera having a separate focusing-chamber and a movable lens, a moving shutter for instantaneous work, arranged to be automatically released by the lens-holder when moved, substantially as described.

14. The case D, having a hinged frame, $a'$, combined with a camera, substantially as and for the purpose specified.

WALTER CLARK.

Witnesses:
C. SEDGWICK,
EDWARD M. CLARK.